United States Patent [19]

Goebel

[11] 4,418,129
[45] Nov. 29, 1983

[54] ELECTROCHEMICAL CELL

[75] Inventor: Franz Goebel, Sudbury, Mass.

[73] Assignee: GTE Products Corporation, Stamford, Conn.

[21] Appl. No.: 354,275

[22] Filed: Mar. 3, 1982

[51] Int. Cl.³ .............................................. H01M 6/14
[52] U.S. Cl. ..................................... 429/91; 429/101; 429/162; 429/196; 429/218
[58] Field of Search .................... 429/91, 90, 101, 162, 429/157, 178, 196, 197, 218

[56] References Cited

U.S. PATENT DOCUMENTS

| | | | |
|---|---|---|---|
| 3,757,793 | 9/1973 | Fester et al. | 429/92 X |
| 4,025,700 | 5/1977 | Fagan, Jr. et al. | 429/91 |
| 4,121,020 | 10/1978 | Epstein et al. | 429/162 |
| 4,132,836 | 1/1979 | Greatbatch | 429/91 |
| 4,169,920 | 10/1979 | Epstein | 429/162 X |
| 4,247,606 | 1/1981 | Uetani et al. | 429/91 |
| 4,259,415 | 3/1981 | Tamura et al. | 429/91 X |
| 4,293,622 | 10/1981 | Marincic et al. | 429/91 X |
| 4,371,592 | 2/1983 | Gabano | 429/91 |
| 4,375,502 | 3/1983 | Gabano | 429/101 |

Primary Examiner—Anthony Skapars
Attorney, Agent, or Firm—Peter Xiarhos; David M. Keay

[57] ABSTRACT

A button-type primary electrochemical cell operative to provide a warning indication toward the end of discharge of the cell signalling an approaching end-of-life of the cell. The cell includes a pair of spaced-apart, flat, porous carbon cathode elements, each in the form of a disc, disposed within a small, generally-flat metal housing of the cell, and a generally-flat anode structure disposed between the pair of carbon cathode elements. The anode structure includes first and second electrochemically active elements, for example, lithium and calcium, having different oxidation potentials within the cell and consumable by electrochemical action within the cell during discharge of the cell. The consumption of the active elements during discharge of the cell results in the establishment of different and distinguishable operating voltages for the cell. The active elements are arranged with respect to each other such that the active element of higher oxidation potential (i.e., the lithium) is consumed prior to the other active element (i.e., the calcium). The change in value of the operating voltage of the cell due to the successive consumption of the two active elements is detected to provide a warning indication signalling the approaching end-of-life of the cell.

8 Claims, 2 Drawing Figures

ELECTROCHEMICAL CELL

CROSS REFERENCE TO RELATED APPLICATION

In co-pending application Ser. No. 354,276, filed concurrently herewith in the names of Franz Goebel and Robert C. McDonald and entitled "ELECTROCHEMICAL CELL", there is disclosed and claimed a cylindrical electrochemical cell capable of providing a warning indication signalling an approaching end-of-life of the cell.

FIELD OF THE INVENTION

The present invention relates to an electrochemical cell and, more particularly, to a disc or button-type primary electrochemical cell operative to provide a warning indication toward the end of discharge of the cell signalling an approaching end-of-life of the cell.

BACKGROUND OF THE INVENTION

Primary electrochemical cells are generally well known and available in a variety of sizes and shapes. One well known form of a primary electrochemical cell is a disc or button-type cell. Such a cell typically comprises a physically thin, generally-flat, battery stack disposed within a small, flat, metal housing and exposed to and permeated by an electrolytic solution. Examples of disc or button-type cells are disclosed in U.S. Pat. Nos. 3,907,593; 4,121,020; 4,169,920; and 4,296,187. A typical battery stack as disclosed in each of the above patents includes a flat lithium anode, a flat carbon cathode structure, and a flat separator of an insulative material interposed between the lithium anode and the carbon cathode structure. A preferred electrolytic solution for the above-described cell includes a reducible soluble cathode and an electrolyte solute dissolved in the reducible soluble cathode. Suitable materials for the reducible soluble cathode and the electrolyte solute are thionyl chloride and lithium tetrachloroaluminate, respectively.

While the electrochemical cells of the above-mentioned patents are capable of satisfactory operation, they do not have the capability of providing a warning signal, indication, or other condition toward the end of discharge of the cell indicating that the cell is approaching the end of its useful or rated life. Such an indication may be useful, for example, in applications (e.g., cardiac pacemakers) in which an early and timely replacement of the cell is necessary or desirable.

Cells capable of providing end-of-life warning signals are described above are disclosed in U.S. Pat. Nos. 4,247,607 and 4,293,622. In U.S. Pat. No. 4,247,607, a button-type lithium halide primary cell is disclosed including a flat lithium anode in contact with a flat iodine/polymer depolarizer and having a step portion comprising about 15 to 5% of the total thickness of the anode and a surface area of from about 40 to 60% of the surface area of the major surface in contact with the depolarizer. An indication of approaching end-of-life is provided by a substantial, detectable increase in the internal impedance of the cell when only 5–15% of the unused lithium anode remains. In U.S. Pat. No. 4,293,622, a lithium/thionyl chloride cell is disclosed in which the electrochemically active components of the cell, including the electrolytic solution, are selected so that the electrolytic solution is exhausted during discharge before the other active components. As a result, a detectable step or transition occurs in the output voltage of the cell which serves as an indication of impending cell discharge. A disadvantage of the cell design of this latter patent is that the limiting of the amount of electrolytic solution makes less of the electrolytic solution available for absorbing soluble gaseous discharge products, such as sulfur dioxide, with the result that an undesirable increase in internal cell pressure may occur.

BRIEF SUMMARY OF THE INVENTION

In accordance with the present invention, a button-type electrochemical cell is provided which is capable of producing an end-of-life warning indication and which avoids shortcomings of prior art devices. The electrochemical cell in accordance with the invention includes a generally-flat metal housing enclosing a volume within which an electrolytic solution and a generally-flat battery stack, representing the electrochemical system of the cell, are disposed. The battery stack includes a pair of spaced-apart cathode elements each in the form of a flat disc, and a generally-flat anode structure between the pair of carbon cathode elements.

The anode structure in accordance with the invention includes first and second flat, active elements. The first flat active element is of a first material having a first oxidation potential within the cell and is consumed by electrochemical action within the cell during discharge of the cell as a result of which a first value of operating voltage for the cell is established during the discharge of the cell and the consumption of the first active element. The second flat active element is of a second material having a second oxidation potential within the cell and is consumed by electrochemical action within the cell during discharge of the cell as a result of which a second value of operating voltage for the cell is established during the discharge of the cell and the consumption of the second active element. The first and second active elements are arranged with respect to each other in accordance with the invention so that one of the active elements is consumed before the other whereby the value of operating voltage of the cell changes from one of its two values to the other of its two values. This change in the value of the operating voltage may be utilized as an end-of-life indication.

DETAILED DESCRIPTION OF THE INVENTION

Figure 1:
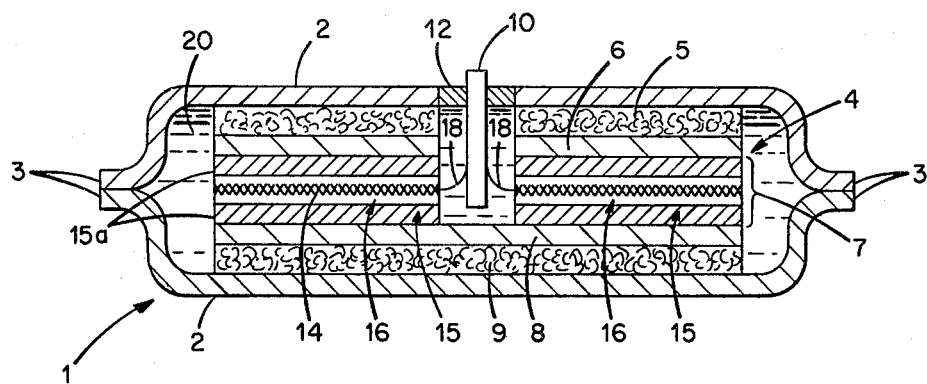
FIG. 1 is an elevational view, partly in cross section and having portions exaggerated for the sake of clarity, of a button-type primary electrochemical cell in accordance with the invention capable of providing a warning condition toward the end of discharge of the cell signalling an approaching end-of-life of the cell.

Referring now to FIG. 1, there is shown a disc or button-type primary electrochemical cell 1 in accordance with the present invention. As shown in FIG. 1, the electrochemical cell 1 includes a pair of similar disc-like metal housing members 2 (e.g., of circular configuration) which are welded together at outwardly turned rims 3 to form a unitary housing and enclose a volume within which a battery stack 4 is disposed. This battery stack 4 comprises, in superimposed fashion (top to bottom): a first flat porous carbon element 5; a first thin, flat, porous separator 6; a generally-flat anode structure 7; a second thin, flat, porous separator 8; and a second flat, porous carbon element 9. Each of the carbon element 5 and the separator 6 further has a central opening therein by which an electrical terminal 10, for example, in the form of a standard metal (e.g., nickel) feedthrough member, may pass and make physical and electrical contact with the anode structure 7. The terminal 10 itself, representing a first electrical terminal of the cell 1, is electrically isolated from the upper metal housing 2 by means of a standard glass or ceramic-to-metal seal 12. The metal housing members 2, which may be of stainless steel, collectively represent a second electrical terminal of the cell 1.

The aforementioned porous carbon elements 5 and 9 are generally circular disc-like elements comprising an aggregation of discrete semi-rigid, porous carbon conglomerates. These conglomerates define a network of electrolyte-conducting channels therethrough and generally comprise a combination of carbon black and a binder such as "Teflon". A suitable diameter (outer) for each of the carbon elements 5 and 9 is 1.25 inch, and a suitable thickness therefor is 0.025 inch.

The aforementioned separators 6 and 8 may be implemented by circular sheets of any suitable porous electrically-nonconductive material such as glass paper. A typical thickness for each of the separators 6 and 8 is 0.007 inch, and typical diameters therefor are 1.25 inch.

The aforementioned anode structure 7 is constructed and utilized in accordance with the invention to alter the operating voltage of the cell 1 as the end of the life of the cell approaches thereby to provide a warning condition signalling the approaching end-of-life of the cell. The anode structure 7 as shown in FIG. 1 generally comprises an electrically-conductive metal substrate 14; first and second consumable active metal electrodes 15 and 16, respectively, in physical and electrical contact with the substrate 14; and a pair of electrically-conductive metal jumper member 18 connected between the substrate 14 and the electrical terminal 10.

The above-mentioned consumable active metal electrode 15 may be implemented by a pair of flat rings 15a of lithium, which are arranged on opposite sides of the consumable active metal electrode 16, which may be implemented by a flat ring of calcium. These particular metals are selected because of their different oxidation potentials, typical values of such potentials being 3.68 volts for lithium and 3.0 volts for calcium (in thionyl chloride). To construct the anode structure 7, the calcium ring 16 is first physically impressed into the substrate 14, which may take the form of a ring of an expanded metal (e.g., nickel) grid, and the lithium rings 15a are then arranged on opposite sides of the calcium ring 16. Suitable approximate thicknesses for the lithium rings 15a are 0.020 inch, and a suitable approximate thickness for the calcium ring 16 is 0.005 inch. Suitable diameters for the rings 15a and 16 are 1 inch each. The substrate 14 has a typical thickness of 0.005 inch. Although calcium is the present preferred material for the active ring 16, other possible materials may also be used for the active ring 16, for example, alloys of alkali metals such as lithium aluminum alloys and lithium boron alloys having suitable oxidation potentials compatible with the lithium metal of the electrode 15.

The aforementioned metal jumper members 18 may each take the form of a small length of a flat ribbon or wire, for example, of nickel, and be secured between the substrate 14 and the electrical terminal 10 in any suitable manner, as by welding.

The battery stack 4 as described hereinabove is exposed to and permeated by an electrolytic solution 20. This solution may be a cathodelectrolyte solution comprising a reducible soluble cathode, such as thionyl chloride, and an electrolytic solute, such as lithium tetrachloroaluminate, dissolved in the thionyl chloride. The cathodelectrolyte solution permeates the porous carbon elements 5 and 9, thereby making contact with interior cathodic particles and providing substantial active surfaces areas or sites for the catalytic reduction of the thionyl chloride.

In the operation of the cell 1 as described hereinabove, specifically, during normal discharge of the cell 1, the reducible soluble cathode, namely, the thionyl chloride, is catalytically reduced at the aforementioned active surface areas or sites of the carbon elements 5 and 9. The catalytic reduction results, inter alia, in the formation of a variety of reaction products within the cell and, as determined by the rate of this catalytic reduction, a gradual depletion of both of the active metals, i.e., the lithium and the calcium, and also a depletion of the thionyl chloride. The lithium and calcium metals are selected quantitatively relative to the electrolytic solution so as to be depleted prior to the depletion of the thionyl chloride in the electrolytic solution. By virtue of the fact that the calcium is covered by the lithium, the lithium is consumed first, specifically, in a direction normal to the surfaces of the lithium, and followed by the consumption of the calcium.

Figure 2:
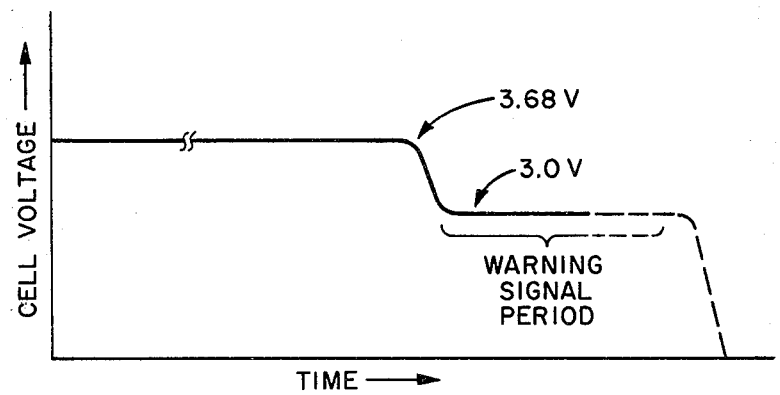
FIG. 2 is a discharge curve of operating voltage versus time for the cell of FIG. 1 illustrating the occurrence of the warning condition representing the approaching end-of-life of the cell.

The transition from the depletion of the lithium to the calcium occurs toward the end-of-life of the cell and results in a drop in operating voltage of the cell due to the lower oxidation potential for the calcium than the lithium. This drop in voltage is depicted in FIG. 2 and is utilized, until such time as all of the calcium has been depleted, to represent a warning signal period indicating the approaching or impending end-of-life of the cell 1. This period may also be used to initiate some other action, for example, switching a load (not shown) powered by the cell to a standby cell or activating external circuitry. The period effectively ends when all of the calcium has been depleted (which depends on the amount of the calcium), thereby effectively marking the end of the useful or rated life span of the cell. The drop in operating voltage of the cell 1 as described hereinabove is clear and unambiguous and capable of being detected and monitored to allow sufficient time for replacing the cell or initiating other appropriate action. Further, during the warning period, the operating voltage of the cell 1 is still large enough, for example, about 3 volts, to ensure that a load connected across and powered by the cell continues to be supplied with ample voltage for ensuring its continued operation.

While there has been described what is considered to be a preferred embodiment of the invention, it will be apparent to those skilled in the art that various changes and modifications may be made therein without departing from the invention as called for in the appended claims.

What is claimed is:
1. A button-type electrochemical cell comprising:
a generally-flat housing enclosing a volume;
an electrochemical system within the housing and including an electrolytic solution and a generally- flat battery stack exposed to said electrolytic solution, said battery stack comprising:
a pair of spaced-apart carbon cathode elements each in the form of a flat disc; and
a generally-flat anode structure between the pair of carbon cathode elements and comprising:
   a first, flat, active element of a first material having a first oxidation potential within the cell, said first active element being consumed by electrochemical action within the cell during discharge of the cell and establishing a first value of operating voltage for the cell during discharge of the cell and the consumption of the first active element; and
   a second, flat, active element of a second material having a second oxidation potential within the cell, said second active element being consumed by electrochemical action within the cell during discharge of the cell and establishing a second, different value of operating potential for the cell during discharge of the cell and consumption of the second active element;
said first and second active elements being arranged with respect to each other so that one of the active elements is consumed before the other whereby the value of operating voltage of the cell changes from one of its two values to the other of its two values;
wherein:
   the electrolytic solution includes a catalytically-reducible soluble cathode;
   the carbon cathode elements are porous carbon structures operative during discharge of the cell to catalytically reduce the soluble cathode of the electrolytic solution; and
   the first active element is of a material having a greater oxidation potential within the cell than that of the second active element and covers the second active element.

2. A button-type electrochemical cell in accordance with claim 1 wherein:
   the reducible soluble cathode of the electrolytic solution is thionyl chloride;
   the carbon cathode elements comprise aggregations of porous carbon conglomerates permeable by the electrolytic solution and defining surface areas for the catalytic reduction of the thionyl chloride in the electrolytic solution;
   the first active element is of a first metal; and
   the second active element is of a second metal.

3. A button-type electrochemical cell in accordance with claim 2 wherein:
   the first active element is of lithium; and
   the second active element is of calcium.

4. A button-type electrochemical cell in accordance with claim 3 wherein:
   the thionyl chloride is consumed during discharge of the cell by electrochemical action within the cell; and
   the lithium and calcium metals are selected so as to be consumed during discharge of the cell prior to the consumption of the thionyl chloride.

5. A button-type primary electrochemical cell comprising:
   a generally-flat metal housing;
   an electrochemical system within the housing and including an electrolytic solution and a generally-flat battery stack exposed to said electrolytic solution, said electrolytic solution including a catalytically-reducible soluble cathode and said battery stack comprising:
      a pair of spaced-apart carbon cathode structure adjacent to the metal housing, said cathode structures being operative during discharge of the cell to catalytically reduce the soluble cathode of the electrolytic solution; and
      a generally-flat anode structure between the carbon cathode structures and comprising:
         a first, flat, active element of a first material having a first oxidation potential within the cell, said first active element being consumed by electrochemical action within the cell during discharge of the cell and establishing a first value of operating voltage for the cell during discharge of the cell and consumption of the first active element;
         a second, flat active element of a second material having a second oxidation potential within the cell, said second active element being consumed by electrochemical action within the cell during discharge of the cell and establishing a second, different value of operating potential for the cell during discharge of the cell and consumption of the second active element;
      said first and second active elements being arranged with respect to each other so that one of the active elements is consumed before the other whereby the value of operating voltage of the cell changes from one of its two values to the other of its two values; and
      an electrical terminal assembly physically and electrically connected to the first and second active elements and extending outwardly from the housing of the cell for the detection externally of the cell of the first and second operating voltages and changes in the values thereof;
wherein:
   the first active element has an oxidation potential within the cell greater than that of the second active element;
wherein:
   the first and second active elements are of metal;
   one of the carbon cathode structures has an opening therethrough;
and wherein the electrical terminal assembly comprises:
   a metal substrate onto which the first and second active elements are disposed for making physical and electrical contact with the first and second active elements; and
   a metal terminal connected with the metal substrate and extending through the opening in the aforesaid one of carbon cathode structures and then outwardly from the housing of the cell.

6. A button-type primary electrochemical cell in accordance with claim 5 wherein:
   the first active element is of lithium; and
   the second active element is of calcium.

7. A button-type primary electrochemical cell in accordance with claim 6 wherein:
   the metal substrate is an expanded metal grid.

8. A button-type primary electrochemical cell in accordance with claim 7 wherein
   said housing comprises two similar disc-like metal housing members welded together at their outer rims to form a unitary housing;
   one of said housing members has a central opening therein;

each of said carbon cathode structures is in the form of a flat disc;

said one of said cathode structures has an opening therethrough centrally thereof and is in physical and electrical contact with said one of said housing members;

the other of said cathode structures is in physical and electrical contact with the other of said housing members;

said second active element of calcium is in the form of a flat ring impressed into said expanded metal grid;

said first active element of lithium is in the form of a pair of flat rings on opposite sides of the flat ring of calcium;

and including a first thin porous separator between said one of said cathode structures and said anode structure to prevent physical contact therebetween, said first separator having a central opening therethrough;

a second thin porous separator between said other of said cathode structures and said anode structure to prevent physical contact therebetween;

and wherein said metal terminal extends through said opening in said one of said housing members and is sealed thereto by electrically insulating means; and said metal terminal extends through the openings in said one of said cathode structures and in said first separator.

* * * * *